No. 872,120. PATENTED NOV. 26, 1907.
J. G. GRAY.
OPTICAL INSTRUMENT.
APPLICATION FILED APR. 8, 1907.
3 SHEETS—SHEET 2.
FIG. III.
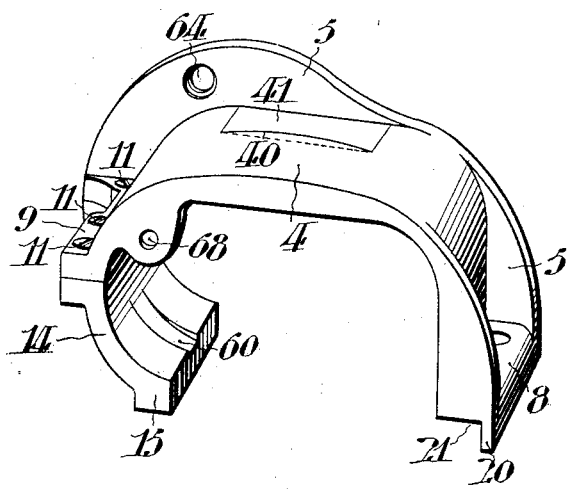
FIG. IV.
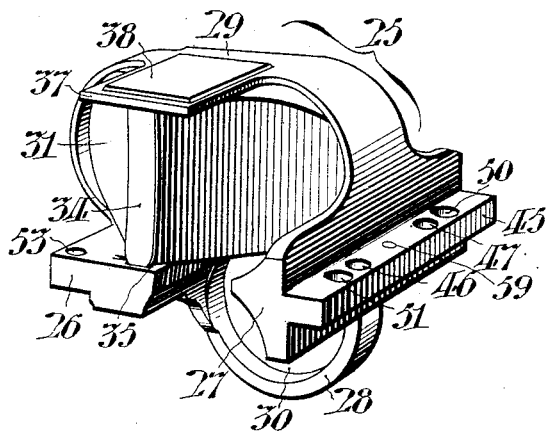
WITNESSES:
INVENTOR:
JOHN GORDON GRAY

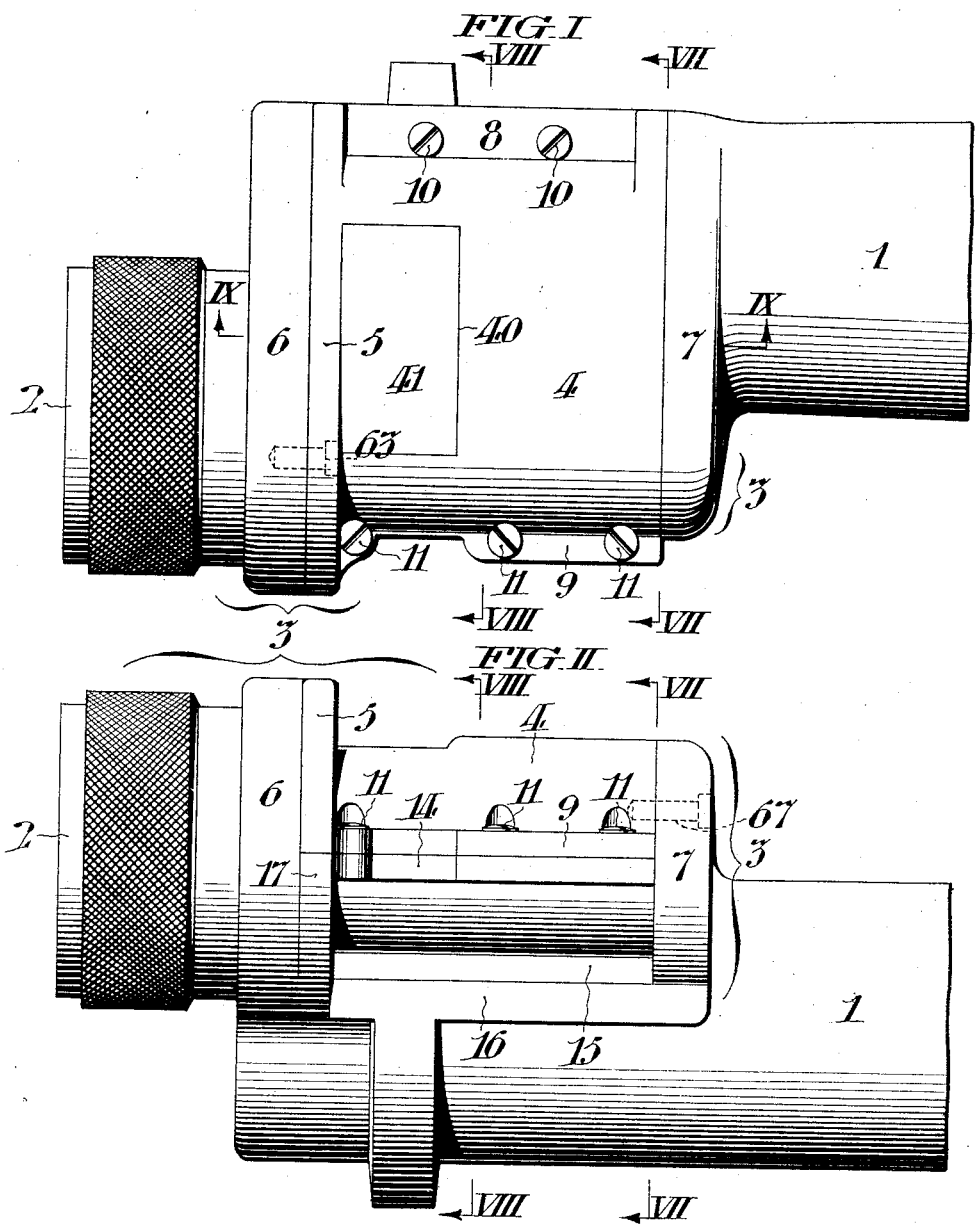

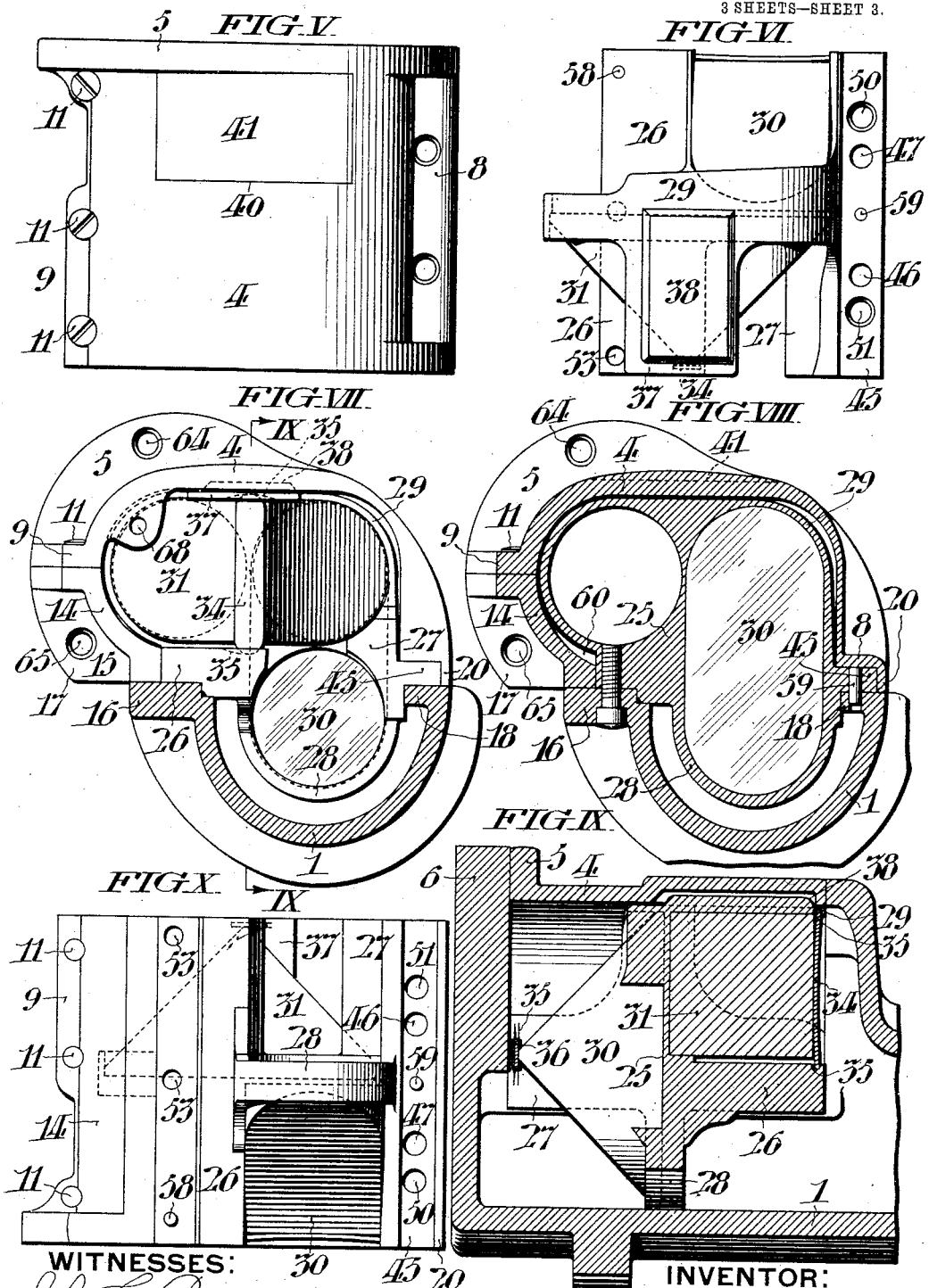

UNITED STATES PATENT OFFICE.

JOHN GORDON GRAY, OF PHILADELPHIA, PENNSYLVANIA.

OPTICAL INSTRUMENT.

No. 872,120.  Specification of Letters Patent.  Patented Nov. 26, 1907.

Application filed April 8, 1907. Serial No. 366,889.

*To all whom it may concern:*

Be it known that I, JOHN GORDON GRAY, residing at No. 5536 Wayne avenue, Germantown, in the city of Philadelphia, county of Philadelphia, and State of Pennsylvania, have invented certain new and useful Improvements in Optical Instruments, whereof the following is a specification, reference being had to the accompanying drawings.

My invention relates to that class of instruments in which several optical elements are grouped side by side within a containing tube or casing, and the main purpose of my invention is to afford complete access to these elements, for cleaning or other purposes, without the necessity of removing them from the casing, and moreover, to permit their removal, when necessary, and their accurate replacement, without reference to the fitting of that removable portion of the casing itself which is immediately adjacent to the group.

In the accompanying drawings, Figure I, represents a top or plan view of the exterior of a portion of a telescope tube or casing illustrating my invention. Fig. II, is a view in side elevation of said portion, the type of instrument selected for illustration being one provided with the so-called "Porro" prisms, which are grouped at the region of the offset shown in Figs. I, and II. Fig. III, is a perspective view of the removable shell, or portion of the casing which is adjacent to the group of optical elements. Fig. IV, is a perspective view of said group of optical elements and their containing frame, removed from the casing. Fig. V, is a top or plan view of the removable shell, shown in Fig. II. Fig. VI, is a top or plan view of the group of optical elements and their frame shown in Fig. IV. Fig. VII, is a transverse section through the instrument on a plane indicated by the line VII, VII, in Figs. I, and II, and looking in the direction of the arrows, the plane of section being such as to indicate, in end elevation, the removable shell and the group of optical elements. Fig. VIII, is a transverse section on the line VIII, VIII, in Figs. I, and II, looking in the direction of the arrows. Fig. IX, is a longitudinal section on the line IX, IX, in Figs. I, and VII. Fig. X, is a plan view of the under side of the group of optical elements, showing the removable shell in its relation thereto, but not indicating the adjacent parts of the body.

Referring to the general organization of the instrument, it may be stated that the main tube of the telescope is comprised in two members whose axes are out of alinement, but parallel, the said two members being united by means of an offset, within which the group of optical elements is mounted.

In the drawings, 1, indicates the end region of one of the members of the telescope casing, and 2, the end region of the other member, the offset region being indicated comprehensively at 3. At this offset the casing comprises a removable shell 4, one end of which has a flange 5, which fits closely against a corresponding flange 6, at the proximate end of the member 2, while the other end of the shell fits against the flange 7, formed at the proximate end of the member 1. A longitudinal flange 8, is formed along one edge of the removable shell 4, to permit the securing thereof by means of screws 10, to the main or integral portion of the offset, while a second longitudinal flange 9, along the opposite edge of the shell permits it to be secured by means of screws 11, to a subjacent part 14, which is also removable from the integral portion of the offset. The lower edge 15, of this part 14, fits upon a longitudinal flange 16, formed on the integral portion of the offset. One end of the member 14, is provided with a flange 17, which fits against the flange 6, of the member 2, the other end of the member 14, fitting against the flange 7, of the member 1.

In Fig. III, the member 14, is shown as secured to the shell 4, by means of the screws 11, the two part shell thus formed being indicated as removed from the offset. The flange 8, upon the shell 4, is provided with a downwardly depending rim 20, extending at right angles to the plane of the under-surface of the flange 8, so as to inclose an elongated angular recess 21. The group of optical elements is mounted in a removable frame shown in perspective in Fig. IV. Said frame comprises two parallel flat bars 26, and 27, which are united by means of a ring 28, and a flattened band 29, both of which may be cast integrally therewith. The prism 31, is embraced and held by the band 29, while the prism 30, is embraced as to one portion of its periphery by the ring 28, and as to the remaining portion by the band, both of which prisms being retained in position by means of spring strips 34, and 36, the ends of which are seated in notches formed in the frame. One of these notches, formed in the bar 26, is indicated at 35, a similar recess being formed in the under-surface of an overhanging projection 37, extending from the central portion of the band. Said projection 37, may be reinforced by flat boss 38, which fits snugly within a corresponding flat recess in the inside surface of the top of the shell 4, the limit of the exterior region corresponding to this depression being indicated by the line 40, (see Figs. III, and V), between which line and the flange 5, the exterior surface of the shell may be flattened as indicated at 41.

The frame which carries the optical elements is directly secured to the integral portion of the casing at the offset, being thus mounted independently of the shell or removable part of the casing at that region. This independent mounting of the frame is attained as follows:—The bar 26, is provided with holes 53, to receive screws which engage with the wide flange 16, formed along the edge of the permanent portion of the offset 3, at that side. The width of this flange 16, is in excess of the width of the bar 26, so that the latter may be seated within the lower portion 15, of the removable member 14, of the shell. Thus the frame is completely embraced and inclosed by said independently removable member 14, at that side. The bar 27, is provided with an external projecting flange 45, which is adapted to be secured to a flange 18, formed along the edge of the permanent portion of the casing at the offset, on the side opposite to the flange 16. Two screw holes 50, and 51, are formed through the flange 45, to receive the screws whereby it is directly secured to the flange 18; two other holes 46, and 47, being also formed through the flange 45, which register with and permit the free passage of the screws 11, by which the flange 8, of the shell 4, is secured to the flange 18, upon the permanent portion of the casing. The downwardly depending rim 20, of the flange 8, embraces and completely incloses the flange 45, which fits snugly within the recess 21, of the shell. If desired, the frame may be provided with pins 58, and 59, upon the under side of the bars 26, and 27, respectively, (see Fig. X), which register with corresponding holes formed in the flanges 16, and 18, respectively, so as to insure accurate fitting, even though there should be some slight play in the screw holes. A curved recess 60, is formed in the inner face of the shell portion 14, to receive the proximate part of the band 29, at that region.

In fitting the instrument together, the frame 25, is first secured in position by means of its independent screws which pass through the holes 50, and 51, in the flange 45, of the bar 27, and through the holes 53, in the bar 26, thus maintaining the frame and the optical elements in their proper relation to the optical axes of the members 1, and 2, of the casing by direct mounting upon the permanent portion of the offset and without dependence upon the accuracy of fit of the removable shell. The portion 14, of the removable shell is then secured in position by means of a screw passing through the hole 65, in its end flange 17, which clamps it against the end flange 6, upon the member 2. The main body 4, of the shell is then placed in position with its flange 9, resting upon the upper edge of the member 14, and with its flange 8, and downwardly depending strip 20, resting upon the upper edge of the flange 45, of the frame. The screws 10, 10, are then inserted and pass freely through the holes 46, 47, of the flange 45, so as to engage with the flange 18, upon the permanent portion of the offset 3. The screws 11, 11, are then inserted and by means thereof the other edge of the shell is secured to the removable part 14. The screw 63, is then inserted through the hole 64, in the flange 5, so as to secure the main portion of the shell to the flange 6, and finally the screw 67, is inserted through the flange 7, and engages in the hole 68, formed in the proximate end of the shell. It will thus be noted that the two parts 4, and 14, comprising the shell can be independently removed, so as to permit access to the optical elements, for the purpose of cleaning, without disturbing the frame in which such elements are mounted.

Where, as in some cases, the optical elements are directly carried by the removable portion of the casing, it is necessary to construct the fitting surfaces upon said removable portion, and upon the permanent portion of the casing, with great accuracy, in order that the optical elements may be properly restored to their correct position, after they have been removed for cleansing purposes. This is always attended with the risk of injury to the optical elements, as they may be dropped or accidentally struck in the handling, and since a notable instance of the use of such devices is in connection with gun sights, it is desirable to avoid such exposure under the very disturbing conditions which may exist. By my invention this risk is avoided, and moreover, the necessity for absolute accuracy in the fitting surfaces is limited to the smallest number of parts, none of which need be exposed when it is necessary to clean the optical elements.

I am of course aware that it is not broadly speaking new to construct an optical instrument with a removable portion of its shell at the region of the optical elements, and I am also aware that it is not new to support such elements in the removable portion of the shell itself. I therefore do not claim such structures.

I claim:—

1. In a telescope provided with an offset at the region of the optical elements, the combination with the permanent casing, having an opening limited by flanges parallel to the optical axes; of a frame adapted to carry the optical elements, said frame comprising longitudinal bars which fit upon said flanges; means for directly securing said bars to said flanges; a removable shell adapted to completely inclose said frame and the elements carried thereby; and means for securing said shell to the permanent portions of said casing independently of the frame.

2. In a telescope provided with an offset at the region of the optical elements, the combination with the permanent casing having an opening limited by flanges parallel to the optical axes; of a frame adapted to carry the optical elements, said frame comprising longitudinal bars which fit upon said flanges; means for directly securing said bars to said flanges; a removable shell comprising a main portion having a downwardly depending rim adapted to inclose one of said bars and an independently removable portion adapted to inclose the other of said bars; means for securing the two parts of said shell together and means for securing said shell directly to the permanent portion of the casing.

In testimony whereof, I have hereunto signed my name, at Philadelphia, Pennsylvania, this sixth day of April, 1907.

JOHN GORDON GRAY.

Witnesses.
JAMES H. BELL,
E. L. FULLERTON.